United States Patent
Kim et al.

(10) Patent No.: US 11,423,129 B2
(45) Date of Patent: Aug. 23, 2022

(54) VENDOR UNIQUE COMMAND AUTHENTICATION SYSTEM, AND A HOST DEVICE, STORAGE DEVICE, AND METHOD EMPLOYING THE SAME

(71) Applicant: SAMSUNG ELECTRONICS CO., LTD., Suwon-si (KR)

(72) Inventors: Bo Hyung Kim, Seoul (KR); Jang Hwan Kim, Suwon-si (KR); Moon Wook Oh, Seoul (KR); Da Woon Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 16/508,027

(22) Filed: Jul. 10, 2019

(65) Prior Publication Data
US 2020/0134142 A1 Apr. 30, 2020

(30) Foreign Application Priority Data
Oct. 30, 2018 (KR) .................. 10-2018-0130382

(51) Int. Cl.
*H04L 29/06* (2006.01)
*G06F 21/31* (2013.01)
*G06Q 20/40* (2012.01)

(52) U.S. Cl.
CPC .......... *G06F 21/31* (2013.01); *G06Q 20/40* (2013.01)

(58) Field of Classification Search
CPC .................. G06F 21/31; G06Q 20/40

USPC ............................................. 726/19
See application file for complete search history.

(56) References Cited

U.S. PATENT DOCUMENTS

| | | | |
|---|---|---|---|
| 2004/0059925 A1 | 3/2004 | Benhammou et al. | |
| 2004/0123127 A1 | 6/2004 | Teicher et al. | |
| 2007/0079092 A1 | 4/2007 | Hara et al. | |
| 2008/0010452 A1* | 1/2008 | Holtzman | H04L 9/3273 713/158 |
| 2009/0019275 A1 | 1/2009 | Park et al. | |
| 2010/0107249 A1* | 4/2010 | Krig | G06F 21/57 726/22 |
| 2011/0239004 A1 | 9/2011 | Hayashi et al. | |
| 2013/0074178 A1* | 3/2013 | Sobol | G06F 21/56 726/17 |
| 2015/0156195 A1 | 6/2015 | Chi | |
| 2015/0365402 A1 | 12/2015 | Woo | |

(Continued)

FOREIGN PATENT DOCUMENTS

| JP | 2008-263548 A | 10/2008 |
|---|---|---|
| KR | 0350931 B1 | 8/2002 |

(Continued)

*Primary Examiner* — Evans Desrosiers
(74) *Attorney, Agent, or Firm* — Volentine, Whitt & Francos, PLLC

(57) ABSTRACT

A host device, a storage device, and a method employ a vendor unique command (VUC) authentication system. The storage device includes a memory and a memory controller which includes a VUC authentication module and controls the memory. The VUC authentication module transmits first memory information about the memory to the host device, receives from the host device a one-time password generated by the first memory information, verifies the one-time password, and receives a vendor unique command from the host device when the one-time password is correct.

20 Claims, 12 Drawing Sheets

(56) References Cited

U.S. PATENT DOCUMENTS

2016/0105426 A1    4/2016  Noh et al.
2020/0336479 A1 * 10/2020  Roth ................... H04L 63/0838

FOREIGN PATENT DOCUMENTS

| KR | 20150007378 A | 1/2016 |
| KR | 1549014 B1 | 9/2016 |
| KR | 20180069765 A | 6/2018 |

* cited by examiner

VENDOR UNIQUE COMMAND AUTHENTICATION SYSTEM, AND A HOST DEVICE, STORAGE DEVICE, AND METHOD EMPLOYING THE SAME

CROSS-REFERENCE TO RELATED APPLICATION

This application claims priority from Korean Patent Application No. 10-2018-0130382 filed on Oct. 30, 2018 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a vendor unique command (VUC) authentication system, and a host device, storage device, and method which employ the VUC authentication system.

2. Description of the Related Art

A vendor unique command (VUC) is a command which is not available to the general public, but is used only to promised specific vendors like manufacturers. The vendor unique command may be available only when the user is a promised vendor. Such a vendor unique command may also be a command for checking an internal arrangement of a storage device or testing at the time of fabricating. As a result, when the vendor unique command is exposed, important technologies of the manufacturers may be exposed to the outside.

In a nonvolatile memory, there is a data encoding/decoding method defined by an authorized group such as a TCG (Trusted Computing Group) for security of data being read and written. However, a method for encoding/decoding the vendor unique command has not yet been presented yet.

SUMMARY

Aspects provide a storage device with enhanced security of a vendor unique command.

Aspects also provide a host device with enhanced security for the vendor unique command.

Aspects also provide a VUC authentication system with enhanced security for the vendor unique command.

Aspects also provide a VUC authentication method with enhanced security for the vendor unique command.

However, aspects are not restricted to the one set forth herein. The above and other aspects will become more apparent to one of ordinary skill in the art to which the present invention pertains by referencing the detailed description given below.

According to an exemplary embodiment of the present inventive concept, there is provided a storage device. The storage device includes a memory and a memory controller which includes a vendor unique command (VUC) authentication module and is configured to control operations on the memory, wherein the VUC authentication module is configured to transmit first memory information about the memory to a host device, to receive a one-time password from the host device and generated by the first memory information, to verify the one-time password, and to receive a vendor unique command from the host device when the one-time password is correct.

According to an exemplary embodiment of the present inventive concept, there is provided a host device. The host device includes: a one-time password generation module which is configured to receive memory information from a storage device and to generate a one-time password, using the memory information; a vendor unique command (VUC) generation module which is configured to receive an acknowledgement signal of the one-time password and to generate a vendor unique command when the acknowledgement signal is received; and an interface which is configured to receive the memory information and the acknowledgement signal from the storage device and to transmit the one-time password and the vendor unique command to the storage device.

According to an exemplary embodiment of the present inventive concept, there is provided a vendor unique command (VUC) authentication system. The VUC authentication system includes: a host device which is configured to receive first memory information, to generate a one-time password through the first memory information, and to transmit a vendor unique command in accordance with an acknowledgement signal; and a storage device which includes a memory, is configured to generate a first memory information of the memory and to transmit the first memory information to the host device, to verify the one-time password to transfer an acknowledgement signal to the host device, and to receive the vendor unique command, wherein the first memory information includes runtime information of the memory.

According to an exemplary embodiment of the present inventive concept, there is provided a method. The method includes: extracting first memory information from a memory device, transmitting the first memory information to a host device, receiving a one-time password associated with the first memory information, verifying the one-time password to transmit an acknowledgement signal to the host device; and receiving a vendor unique command from the host device.

According to an exemplary embodiment of the present inventive concept, there is provided a system. The system comprises: a first device including a user identification module, an authentication request module, a one-time password generation module, and a vendor unique command (VUC) generation module; a second device including an information extraction module, a comparator, and a VUC processing module; and an interface connecting the first device and the second device. The user identification module is configured to receive user information from a user. The authentication module is configured to authenticate the user information and in response thereto to issue an authentication request to the second device. The information module is configured to generate first memory information for a memory device in response to the authentication request and to send the first memory information to the one-time password generation module. The one-time password generation module is configured to generate a one-time password based on the first memory information and to send the one-time password to the second device. The comparator is configured to generate an acknowledge signal when the second device confirms that the one-time password matches the first memory information, and to send the acknowledge signal to the VUC generation module and to the VUC processing module. The VUC generation module is configured to generate a vendor unique command in response to the acknowledge signal and to send the vendor unique command to the VUC processing module, The VUC processing module is configured to process the vendor unique command in response to the acknowledge signal.

BRIEF DESCRIPTION OF THE DRAWINGS

The above and other aspects and features will become more apparent by describing in detail exemplary embodiments thereof with reference to the attached drawings.

DETAILED DESCRIPTION OF THE EMBODIMENTS

Hereinafter, a vendor unique command (VUC) authentication system according to some embodiments will be described with reference to FIGS. 1 to 6.

Figure 1:
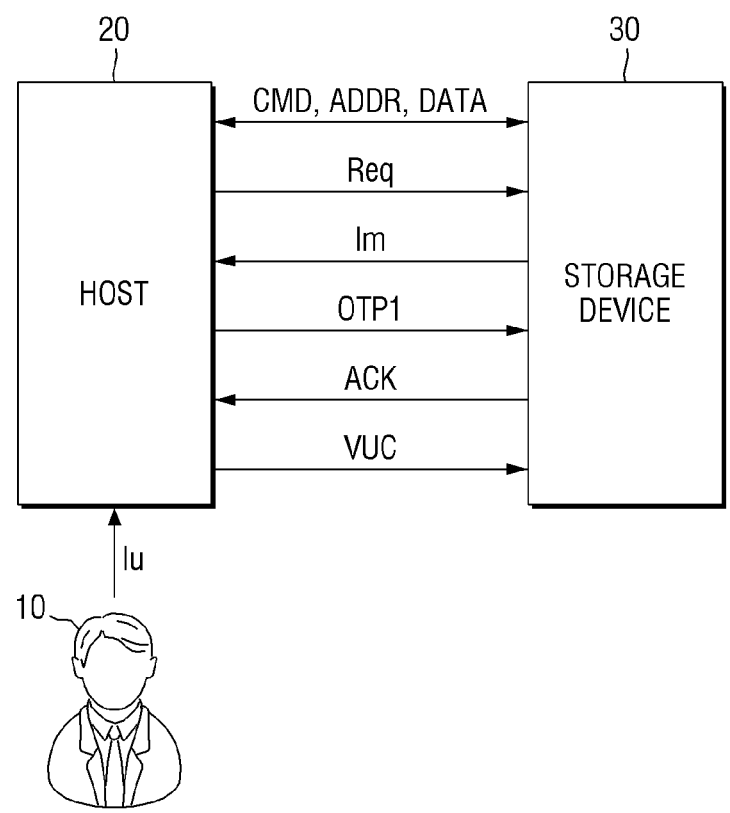
FIG. 1 is a block diagram illustrating a VUC authentication system according to some embodiments.

FIG. 1 is a block diagram illustrating the VUC authentication system according to some embodiments.

Referring to FIG. 1, the VUC authentication system may include a host device 20 and a storage device 30.

Host device 20 may receive user information Iu from a user 10. Host device 20 may transmit an authentication request Req to storage device 30. Host device 20 may receive memory information Im corresponding to the authentication request Req.

Host device 20 may generate a one-time password OTP1 using the memory information Im, and may transmit it to storage device 30. When receiving an acknowledgement signal ACK, host device 20 may transmit a vendor unique command VUC to storage device 30.

Host device 20 may transmit or receive a command CMD, an address ADDR and data DATA to or from storage device 30, independently of the above operation of the vendor unique command VUC. The command CMD, the address ADDR and the data DATA may be associated with memory processing operations such as a read operation, a write operation and an erase operation, apart from the commands for the vendor unique command VUC.

Host device 20 may comprise one of many possible electronic devices, for example electronic devices such as a desktop computer, a game console, a TV and a projector, including portable electronic devices such a mobile phone, an MP3 player and a laptop computer. That is, host device 20 may comprise a wired or a wireless electronic device.

Also, host device 20 includes at least one operating system (OS), and the operating system generally manages and controls the functions and operations of host device 20, and provides interaction between user 10 and host device 20 that use the VUC authentication system or storage device 30, for example via a user interface.

Here, the operating system supports functions and operations corresponding to the intended purpose and use of user 10, and for example, may be divided into a general operating system and a mobile operating system, depending on the mobility of host device 20.

Also, the general operating system in the operating system may be divided into a personal operating system and an enterprise operating system depending on the usage environment of the user, and as one example, the personal operating system is a system which is characterized to support service providing functions for general users and may include WINDOWS®, CHROME OS®, or the like, and the enterprise operating system is a system which is characterized to ensure and support high performance and may include a WINDOWS® server, Linux, Unix or the like.

In addition, the mobile operating system is a system which is characterized to support mobility service providing functionality and a power saving function of the system to users, and may be an ANDROID® operating system, iOS®, WINDOWS® mobile, or the like. At this time, host device 20 may include a plurality of operating systems and execute the operating system for executing operations with storage device 30 corresponding to the user's request.

Storage device 30 may receive an authentication request Req from host device 20 and generate memory information Im. Storage device 30 may transmit the memory information Im to host device 20.

Also, storage device 30 may receive a one-time password OTP1 from host device 20. Storage device 30 verifies the one-time password OTP1 and, may send an acknowledgment signal ACK to host device 20 when appropriate. In this case, storage device 30 may receive a vendor unique command VUC from host device 20 and process the vendor unique command VUC.

Storage device 30 may transmit or receive the command CMD, the address ADDR and the data DATA to or from host device 20, independently of the above operations on the vendor unique command VUC.

That is, storage device 30 operates in response to the command CMD of host device 20, and stores the data DATA to be accessed, in particular, by host device 20. That is to say, storage device 30 may be used as a main storage device or an auxiliary storage device of host device 20. Here, storage device 30 may be implemented as any one of various types of storage devices, depending on a host interface protocol connected to host device 20.

For example, storage device 30 may be implemented as one of various types of storage devices, such as a multimedia card (MMC) in the form of a solid-state drive (SSD), an MMC, eMMC (embedded MMC), a RS-MMC (Reduced Size MMC) and a micro-MMC, a secure digital (SD) card in the form of an SD, a mini-SD and a micro-SD, a USB (Universal Storage Bus) storage device, a UFS (Universal Flash Storage) device, a CF (Compact Flash) card, a smart media card, and a memory stick.

In addition, storage device 30 may be implemented using a volatile memory device such as a DRAM (Dynamic Random Access Memory) and an SRAM (Static RAM), and/or a nonvolatile memory device such as a ROM (Read Only Memory), a MROM (Mask ROM), a PROM (Programmable ROM), an EPROM (Erasable ROM), an EEPROM (Electrically Erasable ROM), a FRAM (Ferromagnetic ROM), a PRAM (Phase change RAM), a MRAM (Magnetic RAM), a RRAM (Resistive RAM), and a flash memory.

When storage device 30 is a solid-state drive, it may be one of a portable SSD, a cSSD (client SSD), a data center SSD (DC SSD) and an enterprise SSD (EP SSD).

Figure 2:
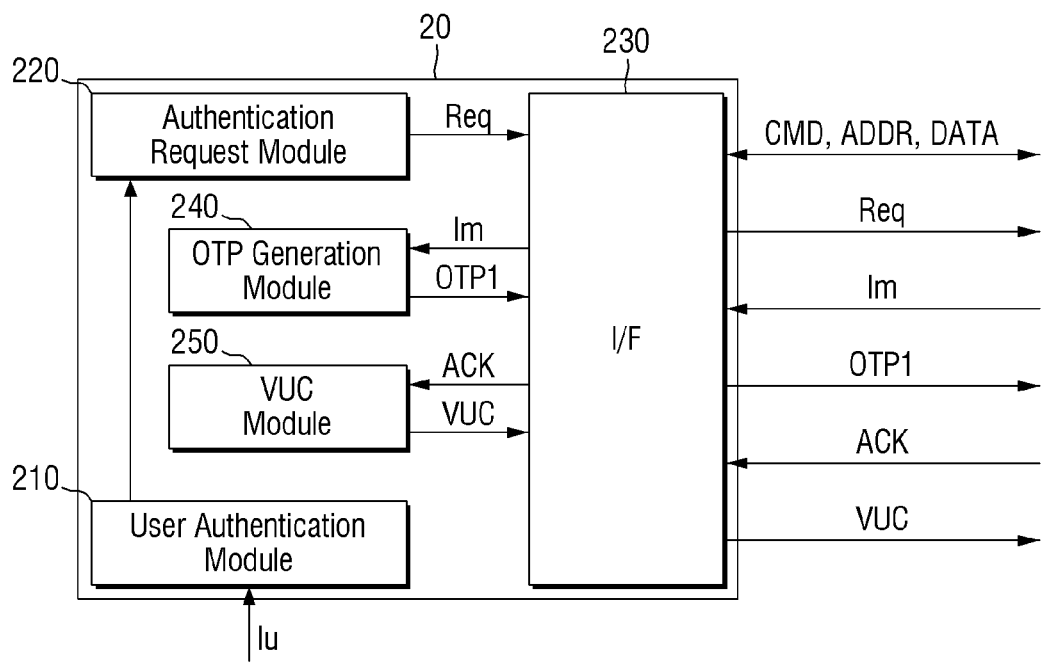
FIG. 2 is a block diagram for explaining an example embodiment of a host device of FIG. 1 in detail.

FIG. 2 is a block diagram for explaining an example embodiment of the host device of FIG. 1 in detail.

Referring to FIG. 2, host device 20 includes a user authentication module 210, an authentication request module 220, an interface 230, a one-time password generation module 240, and a VUC generation module 250.

User authentication module 210 may receive the user information Iu. User authentication module 210 may authenticate whether user 10 of FIG. 1 is a legitimate user through the user information Iu. The user information Iu may be, for example, in the form of a login ID and a password which is supplied by user 10 in FIG. 1. However, the present embodiment is not limited thereto.

After user 10 of FIG. 1 is determined to be a legitimate user by user authentication module 210, authentication request module 220 may receive the user information Iu from user authentication module 210 and may generate the authentication request Req for user 10.

At this time, the authentication request Req may be an authentication request Req of a vendor having legitimate authority of the vendor unique command VUC. In other words, since the vendor unique command VUC is a command that may be used only for the promised user, authentication request module 220 may generate the authentication request Req that requests authentication to the legitimate user of the vendor unique command VUC.

Authentication request module 220 may transmit the authentication request Req to storage device 30 via interface 230.

Interface 230 may receive the authentication request Req from authentication request module 220 and transmit it to storage device 30. Interface 230 may receive the memory information Im from storage device 30 and transmit it to one-time password generation module 240. Interface 230 may receive the one-time password OTP1 from one-time password generation module 240 and transmit it to storage device 30.

Interface 230 may receive the acknowledgment signal ACK from storage device 30 and transmit it to VUC generation module 250. Interface 230 may receive the vendor unique command VUC from VUC generation module 250 and transmit it to storage device 30.

Interface 230 may exchange the command CMD, the address ADDR and the data DATA with storage device 30 in parallel with the request, the signal and the like.

Interface 230 may be configured to communicate with storage device 30 via at least one of various interface protocols, such as a USB (Universal Serial Bus), an MMC (Multi-Media Card), a PCI-E (Peripheral Component Interconnect-Express), an SAS (Serial-attached SCSI), an SATA (Serial Advanced Technology Attachment) a PATA (Parallel Advanced Technology Attachment), an SCSI (Small Computer System Interface), an ESDI (Enhanced Small Disk Interface), an IDE (Integrated Drive Electronics), and an MIPI (Mobile Industry Processor Interface).

One-time password generation module 240 may receive the memory information Im from interface 230 to generate the one-time password OTP1. The memory information Im may be runtime information of the memory in storage device 30. That is, the memory information Im may be information that varies depending on the execution time of the memory in storage device 30. This will be explained later in more detail.

One-time password generation module 240 may generate the one-time password OTP1, using the memory information Im as a seed. At this time, one-time password generation module 240 may include a hash function. In such a case, the one-time password OTP1 may be a hash function value of a specific length. However, embodiments are not limited thereto.

VUC generation module 250 may receive the acknowledgment signal ACK from interface 230. VUC generation module 250 may transmit the vendor unique command VUC to interface 230 in response to the acknowledgment signal ACK. At this time, it is not always necessary to transmit the vendor unique command VUC by the acknowledgment signal ACK, and it is possible to transmit the vendor unique command VUC after the acknowledgment signal ACK is received. That is, when the acknowledgment signal ACK is not received, the vendor unique command VUC may not be transmitted. However, after receiving the acknowledgment signal ACK, the vendor unique command VUC may be freely transmitted. Of course, even after the acknowledgment signal ACK is received, if there is no need, the vendor unique command VUC may not be transmitted.

Figure 3:
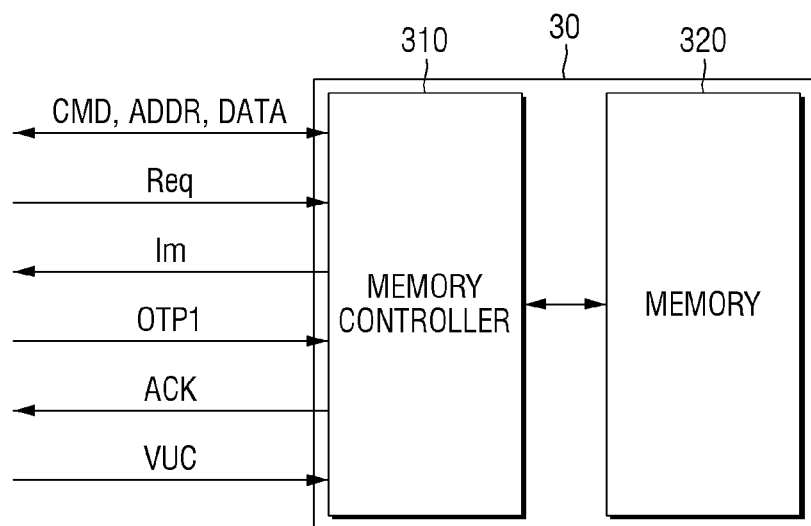
FIG. 3 is a block diagram for explaining an example embodiment of a storage device of FIG. 1 in detail.

FIG. 3 is a block diagram for explaining an example embodiment of the storage device of FIG. 1 in detail.

Referring to FIG. 3, storage device 30 may include a memory controller 310 and a memory 320.

Here, memory controller 310 and memory 320 may be integrated in a single semiconductor device. As an example, memory controller 310 and memory 320 may be integrated in a single semiconductor device to form an SSD. When storage device 30 is used as the SSD, the operation speed of host device 20 connected to storage device 30 may be further improved.

Further, memory controller 310 and memory 320 may be integrated in a single semiconductor device to form a memory card, and may form, for example, a memory card such as a PC card (PCMCIA: Personal Computer Memory Card International Association), a compact flash card (CF), a smart media card (SM, SMC), a memory stick, a multimedia card (MMC, RS-MMC, MMCmicro), an SD card (SD, miniSD, microSD, and SDHC), and a universal flash storage (UFS).

Further, as still another example, storage device 30 may form one of a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a portable multimedia player (PMP), a portable game console, a navigation device, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage constituting a data center, a device capable of transmitting and receiving information in a wireless environment, one of various electronic devices constituting a home network, one of various electronic devices constituting a computer network, one of various electronic devices constituting a telematics network, a radio frequency identification (RFID) device, or one of various constituent elements constituting a computing system, and the like.

Memory controller 310 controls memory 320 in response to a request from host device 20. For example, memory controller 310 may provide the data, which is read from memory 320, to host device 20, and may store the data provided from host device 20 in memory 320. To this end, memory controller 310 may control operations such as read, write, program, and erase of memory 320. To this end, memory controller 310 may receive and transmit the command CMD, the address ADDR and the data DATA.

Memory controller 310 may receive the authentication request Req from host device 20 and in response thereto may transmit the memory information Im to host device 20. Memory controller 310 may receive the one-time password OTP1 from host device 20. Memory controller 310 may verify the one-time password OTP1 and when the one-time password OTP1 is verified, transmit the acknowledgment signal ACK to host device 20.

Further, memory controller 310 may receive transmission of the vendor unique command VUC from host device 20.

Memory 320 may write the data DATA to the address ADDR of memory 320 by the command CMD received by memory controller 310. In addition, the data DATA already written or stored in memory 320 may be read and may be transmitted to host device 20 by memory controller 310.

Figure 4:
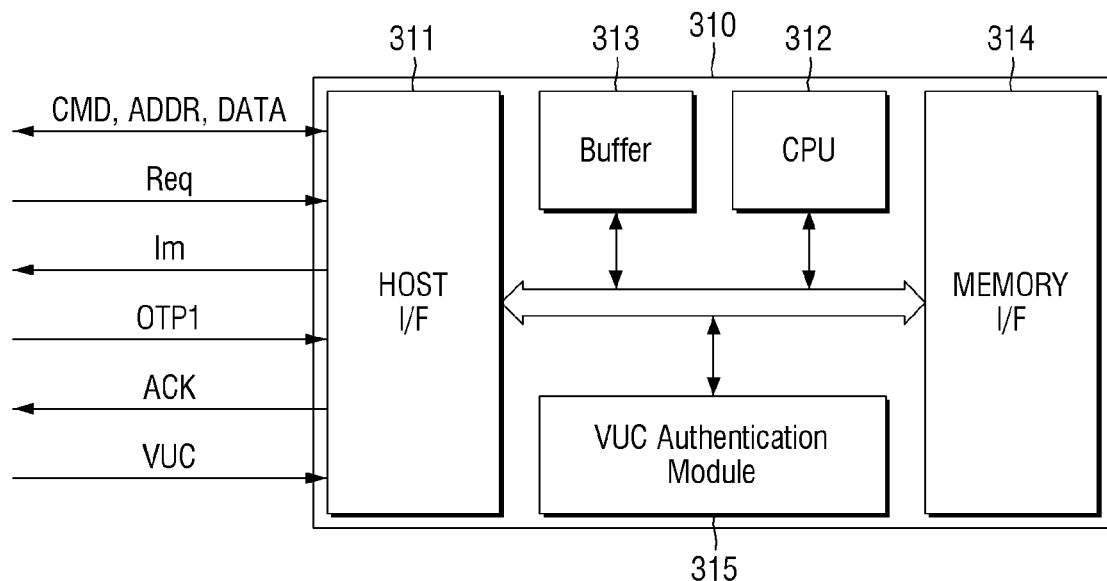
FIG. 4 is a block diagram for explaining an example embodiment of a memory controller of FIG. 3 in detail.

FIG. 4 is a block diagram for explaining an example embodiment of the memory controller of FIG. 3 in detail.

Referring to FIG. 4, memory controller 310 may include a host interface 311, a buffer 313, a central processing unit 312, a first VUC authentication module 315 and a memory interface 314.

Host interface 311 may provide an interface with storage device 30 to correspond to the protocol of host device 20. For example, host interface 311 the may perform communication of the command CMD, the address ADDR and the data DATA with host device 20, using a Universal Serial Bus (USB), a Small Computer System Interface (SCSI), a PCI express, an ATA, a Parallel (PATA), a Serial (SATA), a Serial Attached SCSI (SAS) connection, and the like.

In addition, host interface 311 may execute the disk emulation function that supports host device 20 to recognize storage device 30 as a hard disk drive (HDD).

Host interface 311 may be the same constituent element as interface 230 of FIG. 2. That is, interface 230 in host device 20 of FIG. 2 may be the same constituent element as host interface 311 in storage device 30 of FIG. 4, and may execute an interconnection between host device 20 and storage device 30.

A buffer 313 may temporarily store the data DATA provided from host device 20 and the data DATA read from memory 320. In an embodiment, buffer 313 may include a volatile memory such as a Dynamic Random Access Memory (DRAM) and a Static Random Access Memory (SRAM). In an embodiment, buffer 313 may be a Tightly-Coupled Memory (TCM).

A central processing unit (CPU) 312 may analyze and process the command CMD and the address ADDR provided from host device 20. Central processing unit 312 may communicate with host device 20 via host interface 311 and control memory 320 via memory interface 314. Central processing unit 312 may control the operation of memory 320 on the basis of firmware for driving storage device 30.

Memory interface 314 may transmit data DATA, which is transmitted from buffer 313, to memory 320. Also, memory interface 314 may transmit the data DATA, which is read from memory 320, to buffer 313.

In an embodiment, memory interface 314 may use a flash memory interface type. In this case, memory controller 310 may execute a write operation, a read operation, and an erase operation according to the flash memory interface type.

First VUC authentication module 315 may receive the authentication request Req, the one-time password OTP1 and the vendor unique command VUC from host interface 311. First VUC authentication module 315 may generate the memory information Im and the acknowledgment signal ACK. First VUC authentication module 315 may transmit the memory information Im and the acknowledgment signal ACK to host interface 311.

First VUC authentication module 315 may extract information, process the request, and execute the calculation, using central processing unit 312, host interface 311, buffer 313 and memory interface 314. That is, the operation of first VUC authentication module 315 to be described below may be an operation associated with central processing unit 312, host interface 311, buffer 313 and/or memory interface 314.

Figure 5:
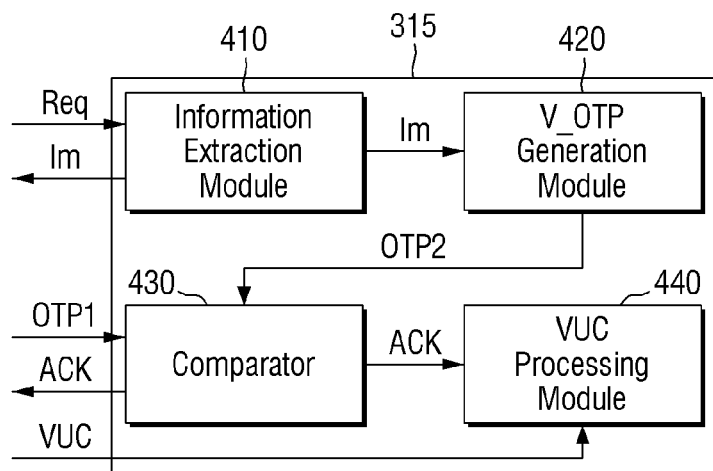
FIG. 5 is a block diagram for explaining an example embodiment of a first VUC authentication module of FIG. 4 in detail.

FIG. 5 is a block diagram for explaining an example embodiment of the first VUC authentication module of FIG. 4 in detail.

Referring to FIG. 5, first VUC authentication module 315 includes a first information extraction module 410, a verification one-time password (V_OTP) generation module 420, a comparator 430 and a VUC processing module 440.

First information extraction module 410 may receive the authentication request Req. First information extraction module 410 may extract the memory information Im when receiving the authentication request Req. The memory information Im may be runtime information of memory 320 of FIG. 3.

For example, the memory information Im may include at least one of a write count, a remap count and a used block count.

Here, the write count means the number of write operations, and the remap count may mean the number of times of remapping the data through garbage collection or wear leveling. The used block count may mean the number or ratio of blocks used in the free block.

The memory information Im may adopt at least one of the runtime information of the memory, in addition to the above-described write count, the remap count and the used block count. In other words, the memory information Im may mean information that continuously changes at the execution time of memory 320.

Figure 6:
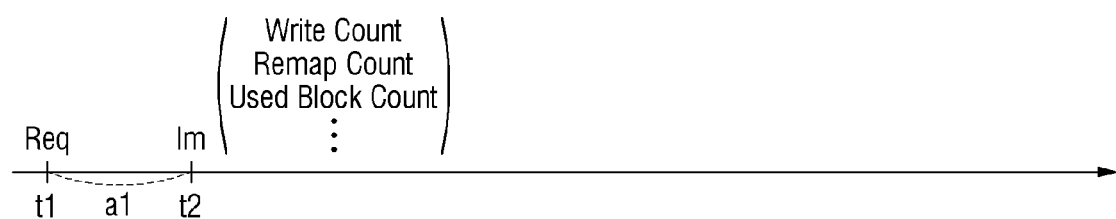
FIG. 6 is a time diagram for explaining a time at which an information extraction module of FIG. 5 extracts memory information.

FIG. 6 is a time diagram for explaining a time at which the information extraction module of FIG. 5 extracts memory information.

Referring to FIGS. 5 and 6, first information extraction module 410 may receive the authentication request Req at the first time t1, and may extract the memory information Im at the second time t2 after the lapse of the first delay a1.

Once first information extraction module 410 confirms and extracts the memory information Im at the second time t2, it may use the memory information Im for VUC authentication without updating later.

Referring again to FIG. 5, first information extraction module 410 may transmit the memory information Im generated at the second time t2 to host device 20 via host interface 311 of FIG. 4. Also, first information extraction module 410 may transmit the same memory information Im to verification one-time password generation module 420.

Verification one-time password generation module 420 may generate a verification one-time password OTP2, using the memory information Im. Verification one-time password generation module 420 may generate the verification one-time password OTP2, using the memory information Im as a seed.

At this time, verification one-time password generation module 420 may include a hash function operator. In such a case, the validation one-time password OTP2 may specify a hash function value of a specific length. At this time, the hash function may be the same hash function as the hash function in one-time password generation module 240 of FIG. 2.

Comparator 430 may receive the one-time password OTP1 from host device 20 via host interface 311 of FIG. 4. Comparator 430 may also receive the verification one-time password OTP2 from verification one-time password generation module 420.

Comparator 430 may compare the one-time password OTP1 with the verification one-time password OTP2. If the one-time password OTP1 and the verification one-time password OTP2 are identical to each other, comparator 430 may output the acknowledgement signal ACK. The acknowledgment signal ACK of comparator 430 is transmitted to host device 20 via host interface 311 of FIG. 4, and may also be transmitted to VUC processing module 440.

If the one-time password OTP1 and the verification one-time password OTP2 are different from each other, a non-acknowledgement signal may be transmitted to host device 20 and VUC processing module 440. In this case, comparator 430 waits until host device 20 transmits the one-time password OTP1 again, and then, when the one-time password OTP1 is newly received, comparator 430 may compare and verify the newly received one-time password OTP1 with the verification one-time password OTP2.

VUC processing module 440 may receive the acknowledgment signal ACK from comparator 430. After receiving the acknowledgement signal ACK, VUC processing module 440 may process the vendor unique command VUC received from host device 20. Until VUC processing module 440 receives the acknowledgement signal ACK from comparator 430, VUC processing module 440 may not process the acknowledgement signal ACK even if the vendor unique command VUC is received from host device 20.

Of course, even after receiving the acknowledgement signal ACK from comparator 430, VUC processing module 440 may not receive the vendor unique command VUC from host device 20.

The VUC authentication system according to the present embodiment may strengthen the security of the vendor unique command VUC. Specifically, the vendor unique command VUC may serve as a "back door" for accessing the storage device. As a result, an attacker who tries to leak the technology of the storage device may perform reverse engineering of the storage device using the vendor unique command VUC, or may grasp the vendor unique command VUC through a brute force attack.

In contrast, since the VUC authentication system according to the present embodiment includes the authentication system for maintaining the security of the vendor unique command VUC, it is possible to prevent the vendor unique command VUC from being exposed to the outside.

Furthermore, the VUC authentication system according to the present embodiment generates the one-time password, using the runtime information of the memory. Thus, even when an authentication system has been exposed to the outside, since the one-time password is generated, using the runtime information which changes all the time as a seed, it is possible to effectively prevent the reverse engineering and the brute force attack.

In addition, since the memory information including the runtime information is necessarily included in the storage device, even if no additional device is required for the storage device, such an authentication method may be executed.

Hereinafter, the VUC authentication system according to some embodiments will be described referring to FIGS. 7 to 10. Repeated parts of the description provided above will be simplified or omitted.

Figure 7:
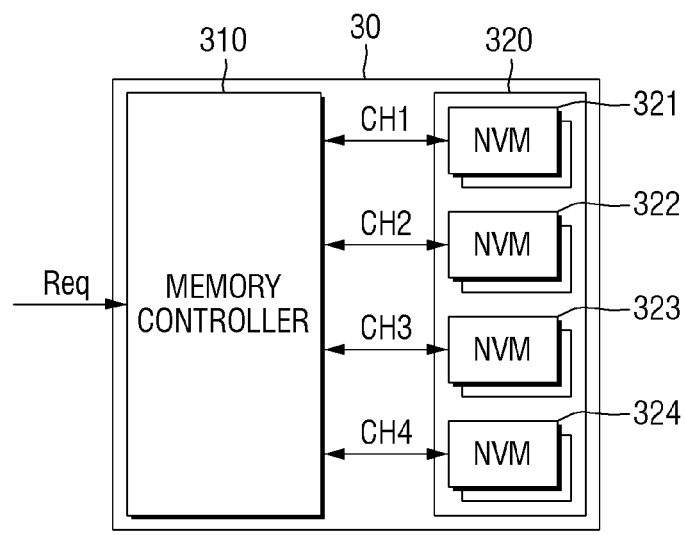
FIG. 7 is a block diagram for explaining an example of the storage device of the VUC authentication system according to some embodiments.

FIG. 7 is a block diagram for explaining an example of a storage device of a VUC authentication system according to some embodiments.

Referring to FIG. 7, memory 320 of storage device 30 of the VUC authentication system according to some embodiments may include a plurality of nonvolatile memories 321 to 324 connected to each of a plurality of channels CH1 to CH4. Each of plurality of nonvolatile memories 321 to 324 may include a flash memory device.

Memory controller 310 may be connected to plurality of nonvolatile memories 321 to 324 via the plurality of channels CH1 to CH4, respectively. In FIG. 7, the number of the above-mentioned channels is illustrated as four, but embodiments are not limited thereto. Memory 320 of storage device 30 of the VUC authentication system according to some embodiments may have three or fewer channels or five or more channels.

Specifically, memory controller 310 may be connected to first nonvolatile memory 321 via the first channel CH1, and may be connected to second nonvolatile memory 322 via the second channel CH2. Memory controller 310 may be connected to third nonvolatile memory 323 via the third channel CH3 and may be connected to fourth nonvolatile memory 324 via the fourth channel CH4.

Memory controller 310 may operate each of the plurality of memory blocks included in plurality of nonvolatile memories 321 to 324 in one of a single level cell (SLC) mode, a multi-level cell (MLC) mode, and a triple level cell (TLC) mode.

Figure 8:
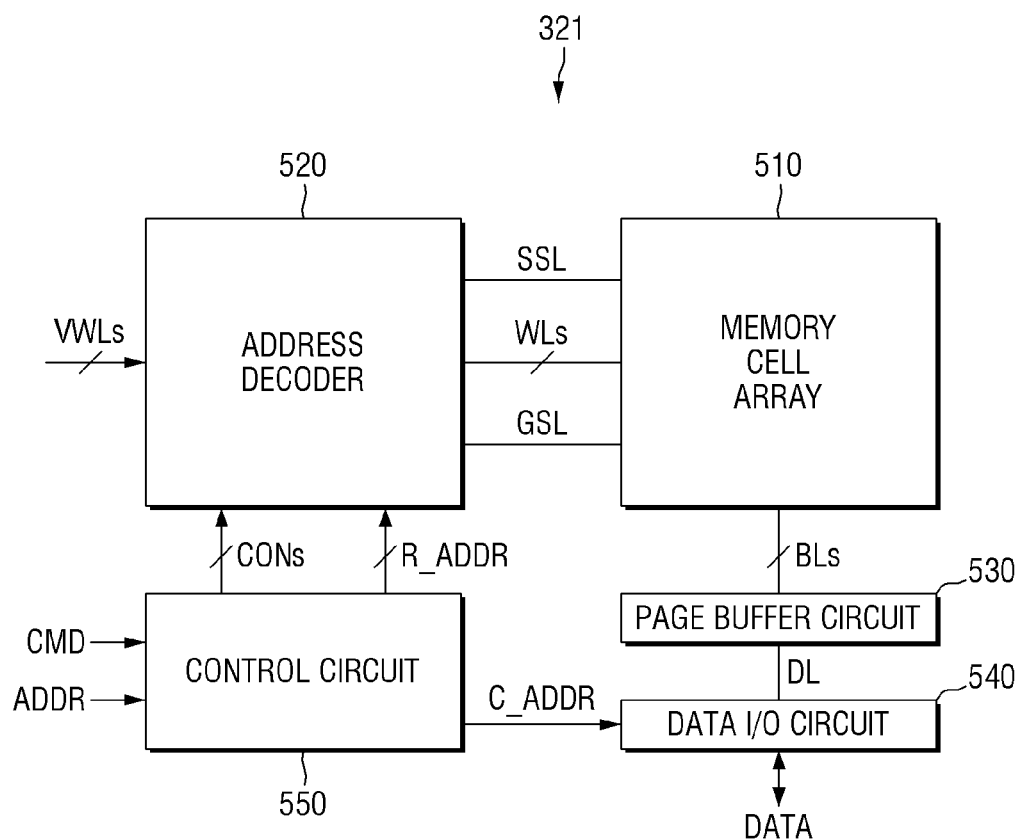
FIG. 8 is a block diagram for explaining a structure of an example embodiment of the nonvolatile memory of FIG. 7 in detail.

FIG. 8 is a block diagram for explaining the structure of an example embodiment of the nonvolatile memory of FIG. 7 in detail.

Referring to FIG. 8, first to fourth nonvolatile memories 321 to 324 of FIG. 7 may be implemented, like first nonvolatile memory 321 of FIG. 8, respectively.

First nonvolatile memory 321 may include a memory cell array 510, an address decoder 520, a page buffer circuit 530, a data input/output circuit 540 and a control circuit 550.

Memory cell array 510 may be connected to address decoder 520 through a string selection line SSL, a plurality of word lines WLs and a ground selection line GSL. Also, memory cell array 510 may be connected to page buffer circuit 530 via a plurality of bit lines BLs.

Memory cell array 510 may include the plurality of memory blocks, and each of the plurality of memory blocks may include a plurality of memory cells MCs connected to the plurality of word lines WLs and the plurality of bit lines BLs.

In an embodiment, memory cell array 510 may be a three-dimensional memory cell array formed on the substrate in a three-dimensional structure (or a vertical structure). In this case, memory cell array 510 may include vertical memory cell strings including a plurality of memory cells formed by being stacked on each other.

In another embodiment, memory cell array 510 may be a two-dimensional memory cell array formed on the substrate in a two-dimensional (or a horizontal structure).

Figure 9:
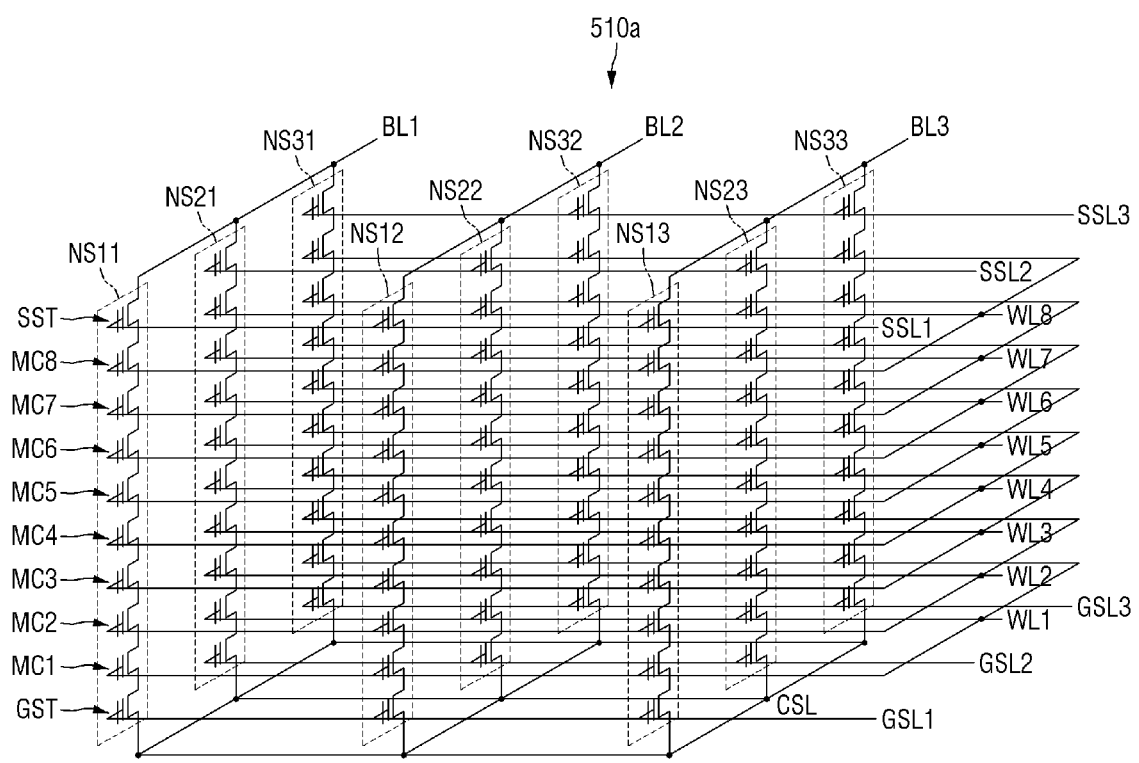
FIG. 9 is an exemplary equivalent circuit diagram for explaining an example embodiment of the memory cell array of FIG. 8 in detail.

FIG. 9 is an exemplary equivalent circuit diagram for explaining an example embodiment of the memory cell array of FIG. 8 in detail.

A memory cell array 510a of FIG. 9 may correspond to memory cell array 510 of FIG. 8. Memory cell array 510a illustrated in FIG. 9 illustrates a three-dimensional memory cell array formed on the substrate in the three-dimensional structure. For example, a plurality of memory cell strings included in memory cell array 510a may be formed in a direction perpendicular to the substrate.

Referring to FIG. 9, memory cell array 510 may include a plurality of memory cell strings NS11 to NS33 connected between the bit lines BL1, BL2 and BL3 and the common source line CSL. Each of the plurality of memory cell strings NS11 to NS33 may include a string selection transistor SST, a plurality of memory cells (MC1, MC2, ..., MC8) and a ground selection transistor GST.

Although FIG. 9 illustrates that each of the plurality of memory cell strings NS11 to NS33 includes eight memory cells (MC1, MC2, ..., MC8), embodiments are not limited thereto.

The string selection transistor SST may be connected to the corresponding string selection lines SSL1, SSL2 and SSL3. A plurality of memory cells (MC1, MC2, ..., MC8) may be connected to corresponding word lines (WL1, WL2, ..., WL8). The ground selection transistor GST may be connected to the corresponding ground selection lines GSL1, GSL2 and GSL3. The string selection transistor SST may be connected to the corresponding bit lines BL1, BL2 and BL3, and the ground selection transistor GST may be connected to the common source line CSL.

The word lines (e.g., WL1) of the same height are commonly connected, and the ground selection lines GSL1, GSL2 and GSL3 and the string selection lines SSL1, SSL2 and SSL3 may be separated, respectively.

Although FIG. 9 illustrates that memory cell array 510a is connected to eight word lines (WL1, WL2, WL8) and three bit lines BL1, BL2 and BL3, the present invention is not limited thereto.

Figure 10:
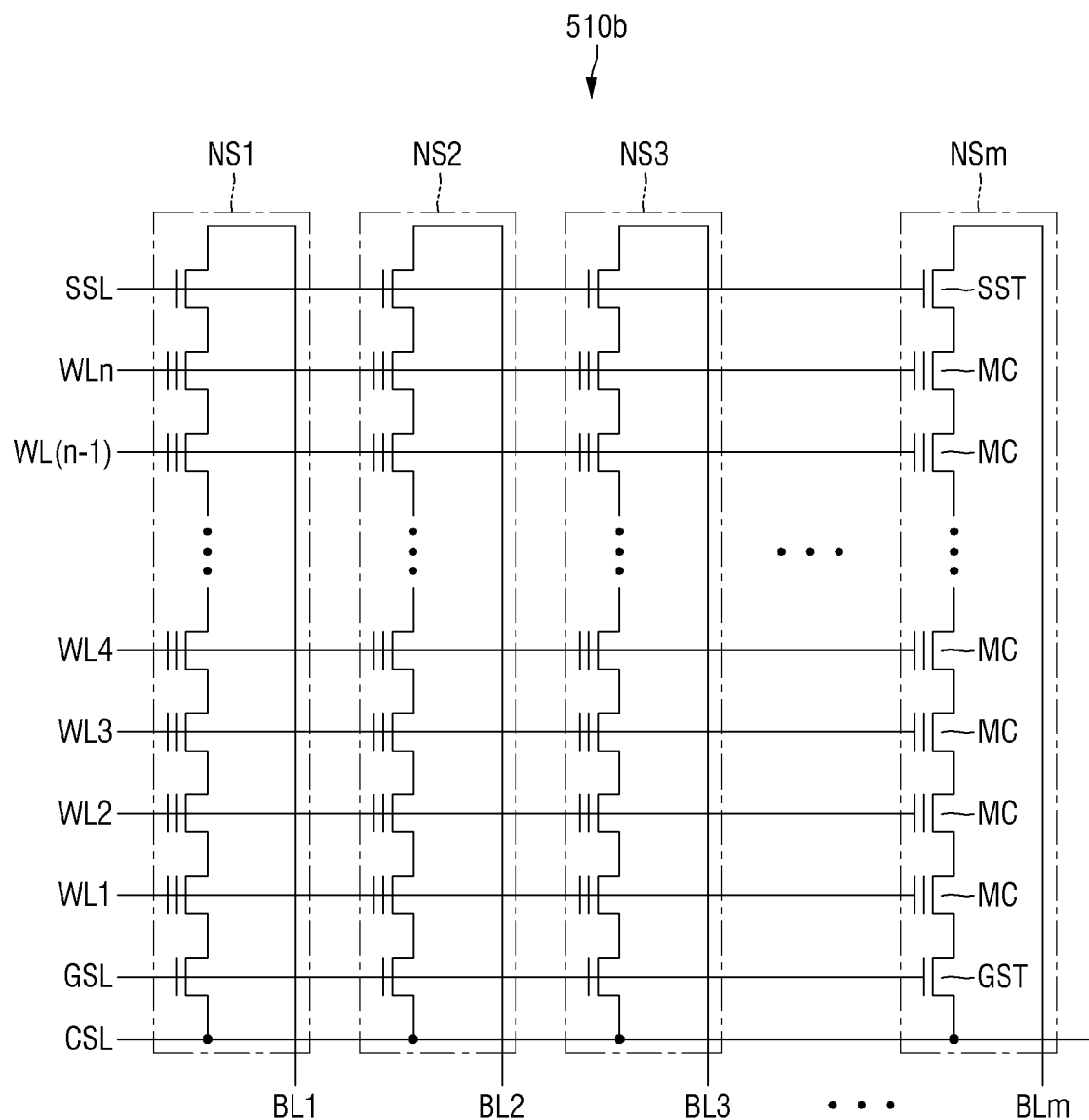
FIG. 10 is an exemplary equivalent circuit diagram for explaining an example embodiment of the memory cell array of FIG. 8 in detail.

FIG. 10 is an exemplary equivalent circuit diagram for explaining an example embodiment of the memory cell array of FIG. 8 in detail.

A memory cell array 510b of FIG. 10 may correspond to memory cell array 510 of FIG. 8. Memory cell array 510b illustrated in FIG. 10 illustrates a two-dimensional memory cell array formed on the substrate in the two-dimensional structure. For example, a plurality of memory cell strings included in memory cell array 510b may be formed in a direction horizontal to the substrate.

Referring to FIG. 10, memory cell array 510b may include a plurality of memory cell strings (NS1, NS2, NS3, ..., NSm).

Each of the plurality of memory cell strings (NS1, NS2, NS3, ..., NSm) includes a string selection transistor SST, a plurality of memory cells MC and a ground selection transistor GST connected in series to each other.

The string selection transistors SST included in the plurality of memory cell strings (NS1, NS2, NS3, ..., NSm) may be commonly connected to the string selection line SSL. Memory cells formed in the same row among a plurality of memory cells MC included in the plurality of memory cell strings (NS1, NS2, NS3, ..., NSm) may be commonly connected to the corresponding word lines (WL1, WL2, WL3, WL4, ..., WL(n−1), and WLn). The ground selection transistors GST included in the plurality of memory cell strings (NS1, NS2, NS3, ..., NSm) may be commonly connected to the ground selection line GSL.

The ground selection transistors GST included in the plurality of memory cell strings (NS1, NS2, NS3, ..., NSm) may be commonly connected to the common source line CSL.

The string selection transistors SST included in the plurality of memory cell strings (NS1, NS2, NS3, ..., NSm) may be connected to the corresponding bit lines (BL1, BL2 and BL3).

Here, symbols n and m represent a positive integer, respectively.

Referring again to FIG. 8, control circuit 550 receives the command CMD and the address ADDR from memory controller 310, and may control the write operation, the read operation, and the erase operation of first nonvolatile memory 321, on the basis of the command CMD and the address ADDR.

For example, control circuit 550 may generate control signals CONs on the basis of the command CMD, and may generate a row address R_ADDR and a column address C_ADDR on the basis of the address ADDR. Control circuit 550 may provide the control signal CONs and the row address R_ADDR to address decoder 520 and provide the column address C_ADDR to data input/output circuit 540.

Address decoder 520 may be connected to memory cell array 510 through the string selection line SSL, the plurality of word lines WLs and the ground selection line GSL.

At the time of the write operation or the read operation, address decoder 520 may determine one of the plurality of word lines WLs as a selected word line on the basis of the row address R_ADDR provided from control circuit 550, and may determine the remaining word lines except the selected word line among the plurality of word lines WLs as non-selected word lines.

Address decoder 520 may receive the word line voltages VWLs necessary for the operation of first nonvolatile memory 321 from a voltage generation unit disposed inside or outside first nonvolatile memory 321. The word line voltages VWLs may be applied to the plurality of word lines WLs through address decoder 520.

A page buffer circuit 530 may be connected to memory cell array 510 through a plurality of bit lines BLs.

Page buffer circuit 530 may include a plurality of page buffers. In an embodiment, one bit line may be connected to one page buffer. In another embodiment, two or more bit lines may be connected to one page buffer.

Page buffer circuit 530 temporarily stores the data to be written to the selected page at the time of the write operation, and may temporarily store the data read from the selected page at the time of the read operation.

Data input/output circuit 540 may be connected to page buffer circuit 530 via the data line DL.

At the time of the write operation, data input/output circuit 540 receives the write data DATA from memory controller 310, and may provide the write data DATA to page buffer circuit 530 on the basis of the column address C_ADDR provided from control circuit 550.

At the time of the read operation, data input/output circuit 540 may provide the read data DATA stored in page buffer circuit 530 to memory controller 310, on the basis of the column address C_ADDR provided from control circuit 550.

Although an example of the plurality of nonvolatile memories 321 to 324 included in storage device 30 has been described with reference to FIGS. 7 to 10, embodiments are not limited thereto, and each of the plurality of nonvolatile memories 321 to 324 may be implemented in various forms.

Hereinafter, a VUC authentication system according to some embodiments will be described referring to FIGS. 11 to 13. Repeated parts of the description provided above will be simplified or omitted.

Figure 11:
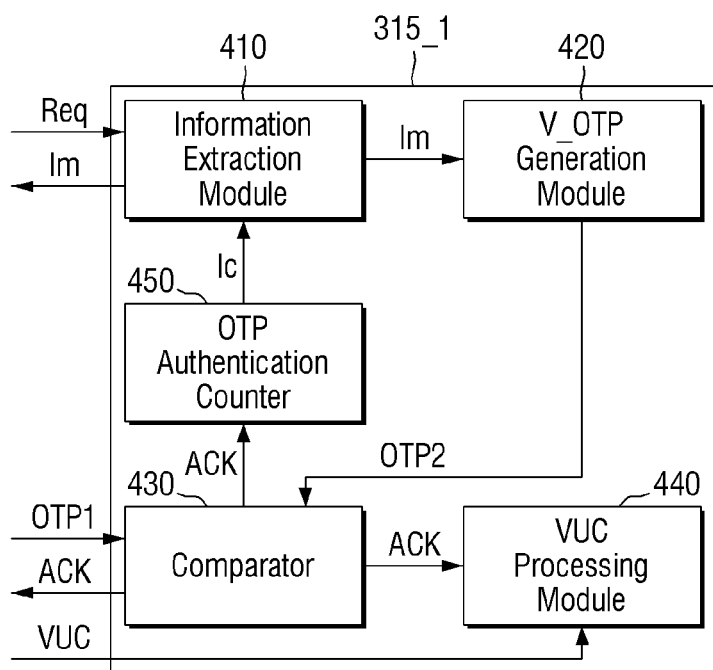
FIG. 11 is a block diagram for explaining the VUC authentication system according to some embodiments.
Figure 12:
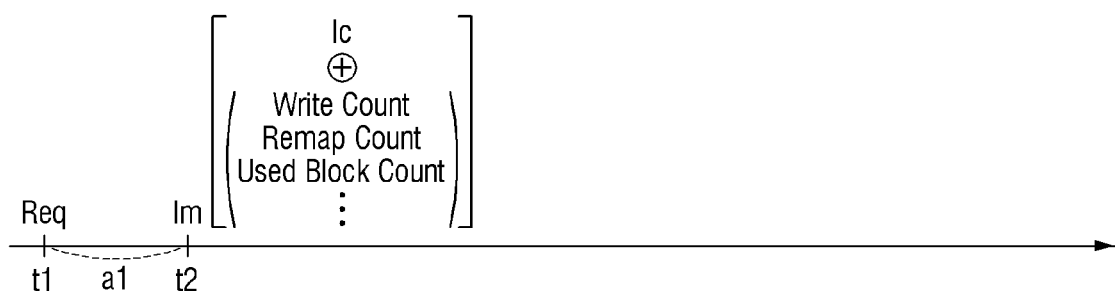
FIG. 12 is a time diagram for explaining a time at which the memory information is extracted from the VUC authentication system of FIG. 11.

FIG. 11 is a block diagram for explaining the VUC authentication system according to some embodiments, and FIG. 12 is a time diagram for explaining a time at which memory information is extracted from the VUC authentication system of FIG. 11. FIG. 13 is a time diagram for explaining a time at which memory information is extracted from the VUC authentication system of FIG. 11 in a two-cycle authentication procedure.

Figure 13:
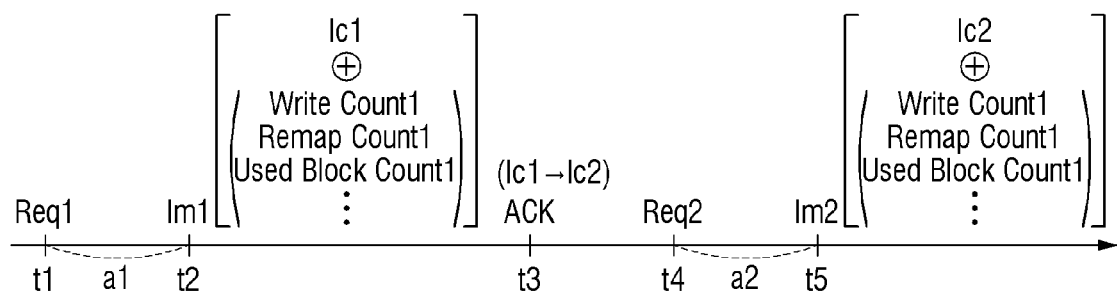
FIG. 13 is a time diagram for explaining a time at which memory information is extracted in a two-cycle authentication procedure in the VUC authentication system of FIG. 11.

Referring to FIGS. 11 to 13, the memory controller of the storage device of the VUC authentication system according to some embodiments may include a second VUC authentication module 315_1.

Second VUC authentication module 315_1 may include a one-time password authentication counter 450.

When comparator 430 receives and compares the one-time password OTP1 and the verification one-time password OTP2, respectively, one-time password authentication counter 450 may receive the acknowledgement signal ACK. That is, comparator 430 may transmit the acknowledgement signal ACK to host device 20, VUC processing module 440 and one-time password authentication counter 450, respectively.

When receiving the acknowledgement signal ACK, one-time password authentication counter 450 may record or update the number of times the one-time password authentication has been performed. That is, one-time password authentication counter 450 may generate counting information Ic indicating how many times authentication using the one-time password OTP1 is executed. One-time password authentication counter 450 may update the counting information Ic each time the acknowledgment signal ACK is received from comparator 430.

First information extraction module 410 may receive the counting information Ic from one-time password authentication counter 450. First information extraction module 410 may extract information by including the counting information Ic in the memory information Im.

Referring to FIG. 12, at the second time t2, first information extraction module 410 may include not only the runtime information, including at least one of a write count, a remap count and a used block count, but also the counting information Ic in the memory information Im.

Since the counting information Ic may also be continuously updated when authentication using the one-time password OTP1 is continued, when the counting information Ic at the second time t2 is extracted as the memory information Im, the memory information Im may be confirmed without being changed later.

Referring to FIGS. 11 and 13, when the first information extraction module 410 receives the first authentication request Req1 at the first time t1, the runtime information including at least one of a first write count (Write count 1), a first remap count (Remap count 1) and a first used block count (Used block count 1) at the second time t2 after the first delay a1, and the first memory information Im1 including the first counting information Ic1 at the second time t2, may be confirmed by the first information extraction module 410.

In the case where comparator 430 executes the verification by the first memory information Im1 to output the acknowledgment signal ACK at the third time t3, one-time password authentication counter 450 may update the first counting information Ic1 to the second counting information Ic2. The second counting information Ic2 may be information indicating that the number of the one-time password authentication is added once in the first counting information Ic1.

Thereafter, the second authentication request Req2 may be received by first information extraction module 410 at the fourth time t4 by host device 20. First information extraction module 410 may extract the second memory information Im2 at the fifth time t5 after a second delay a2 from the fourth time t4.

At this time, the second delay a2 may be the same as or different from that of the first delay a1. The first delay a1 and the second delay a2 may be caused by a delay in the response of the internal circuit of first information extraction module 410 or the external signal.

Assuming that the runtime information such as the write count, the remap count and the used block count did not change between the second time t2 and the fifth time t5, the second memory information Im2 may include runtime information including at least one of a first write count (Write count 1), a first remap count (Remap count 1) and a first used block count (Used block count 1), like the first memory information Im1.

Also, the second memory information Im2 may include the updated second counting information Ic2. If each of the first memory information Im1 and the second memory information Im2 does not include the first counting information Ic1 and the second counting information Ic2, the first memory information Im1 and the second memory information Im2 may be identical to each other.

In this case, since the first memory information Im1 and the second memory information Im2 are identical to each other, the one-time password OTP1 generated using each of them as a seed may be identical to each other. Therefore, when an attacker continuously tries to make one-time password authentication before the runtime information changes, the security of the vendor unique command VUC of storage device 30 may be vulnerable.

The VUC authentication system according to the present embodiment may effectively defend continuous authentication trials by including the counting information Ic in the memory information Im.

Hereinafter, the VUC authentication system according to some embodiments will be described referring to FIGS. 14 and 15. Repeated parts of the description provided above will be simplified or omitted.

Figure 14:
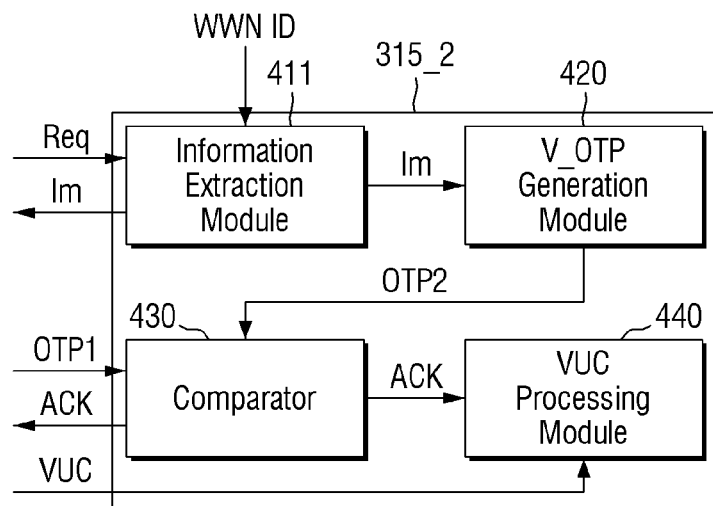
FIG. 14 is a block diagram for explaining the VUC authentication system according to some embodiments.
Figure 15:
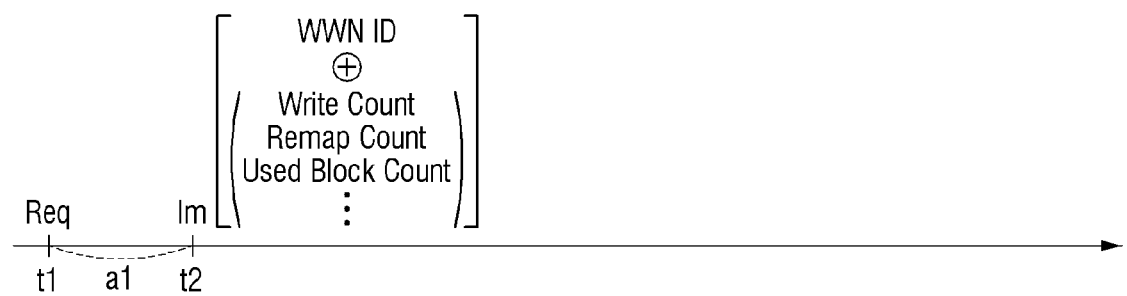
FIG. 15 is a time diagram for explaining a time at which the memory information is extracted from the VUC authentication system of FIG. 14.

FIG. 14 is a block diagram for explaining the VUC authentication system according to some embodiments, and FIG. 15 is a time diagram for explaining the time at which memory information is extracted from the VUC authentication system of FIG. 14.

Referring to FIGS. 14 and 15, the memory controller of the storage device of the VUC authentication system according to some embodiments may include a third VUC authentication module 315_2.

Third VUC authentication module 315_2 may include a second information extraction module 411. In addition to the runtime information, second information extraction module 411 may also include a worldwide name ID (WWN ID) in the memory information Im. Since the world wide name ID (WWN ID) is a fixed value even if time elapses, it may be simply included in the memory information Im by second information extraction module 411 at the second time t2.

In such a case, different storage devices having the same runtime information by chance may also use different one-time passwords OTP1 through the world wide name ID (WWN ID) which is a unique identification number.

Hereinafter, the VUC authentication system according to some embodiments will be described referring to FIGS. 16 and 17. Repeated parts of the description provided above will be simplified or omitted.

Figure 16:
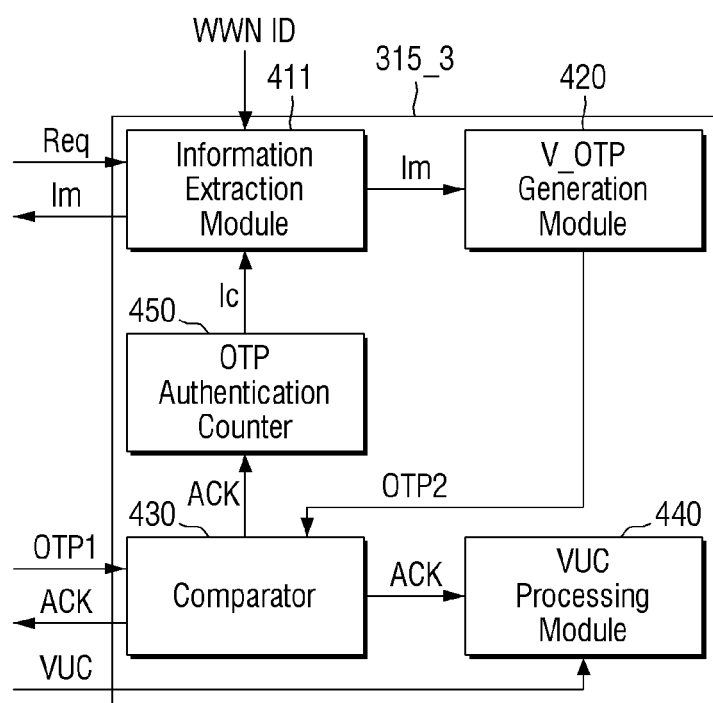
FIG. 16 is a block diagram for explaining the VUC authentication system according to some embodiments.
Figure 17:
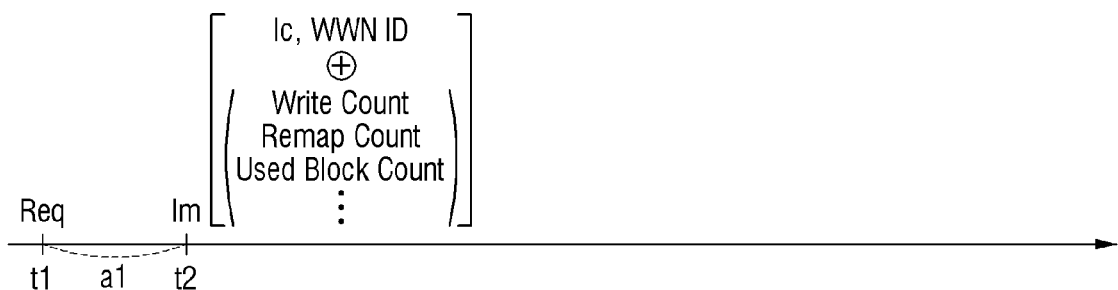
FIG. 17 is a block diagram for explaining the VUC authentication system according to some embodiments.

FIG. 16 is a block diagram for explaining the VUC authentication system according to some embodiments, and FIG. 17 is a block diagram for explaining the VUC authentication system according to some embodiments FIG.

Referring to FIGS. 16 and 17, the memory controller of the storage device of the VUC authentication system according to some embodiments may include a fourth VUC authentication module 315_3.

Fourth VUC authentication module 315_3 may include a second information extraction module 411 and a one-time password authentication counter 450. The VUC authentication system according to the present embodiment protects against the trial of continuous authentication by including the counting information Ic and the world wide name ID (WWN ID), as well as the runtime information in the memory information Im, and may make the one-time passwords of different storage devices 30 having the same runtime information in advance different from each other.

Hereinafter, the VUC authentication system according to some embodiments will be described referring to FIG. 18. Repeated parts of the description provided above will be simplified or omitted.

Figure 18:
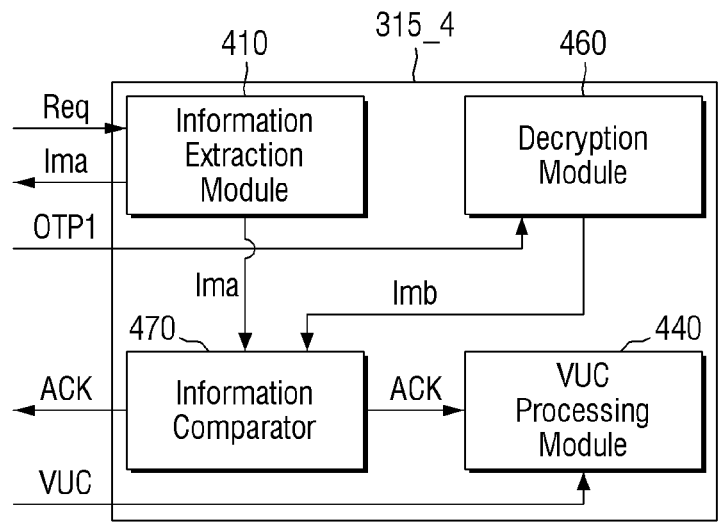
FIG. 18 is a block diagram for explaining the VUC authentication system according to some embodiments.

FIG. 18 is a block diagram illustrating the VUC authentication system according to some embodiments.

Referring to FIG. 18, the memory controller of the storage device of the VUC authentication system according to some embodiments may include a fifth VUC authentication module 315_4.

Fifth VUC authentication module 315_4 may include a first information extraction module 410, a decryption module 460 and an information comparator 470.

First information extraction module 410 may extract the first memory information Ima in response to the authentication request Req. Decryption module 460 may receive the one-time password OTP1 from host device 20. Decryption module 460 may decrypt the one-time password OTP1 to extract the second memory information Imb. That is, in a reverse operation of generating the one-time password OTP1 by host device 20, using the first memory information Ima as a seed, decryption module 460 may generate the second memory information Imb, using the one-time password OTP1.

Information comparator 470 may receive the first memory information Ima from first information extraction module 410. Information comparator 470 may compare the first memory information Ima and the second memory information Imb with each other. When the first memory information Ima and the second memory information Imb are identical to each other, information comparator 470 may transmit the acknowledgement signal ACK to host device 20 and VUC processing module 440.

Since the VUC authentication system according to the present embodiment sets the memory information as a comparison object, higher-precision authentication is possible as compared with comparing the one-time passwords.

Hereinafter, a VUC authentication method according to some embodiments will be described with reference to FIGS. 1 and 19. Repeated parts of the description provided above will be simplified or omitted.

Figure 19:
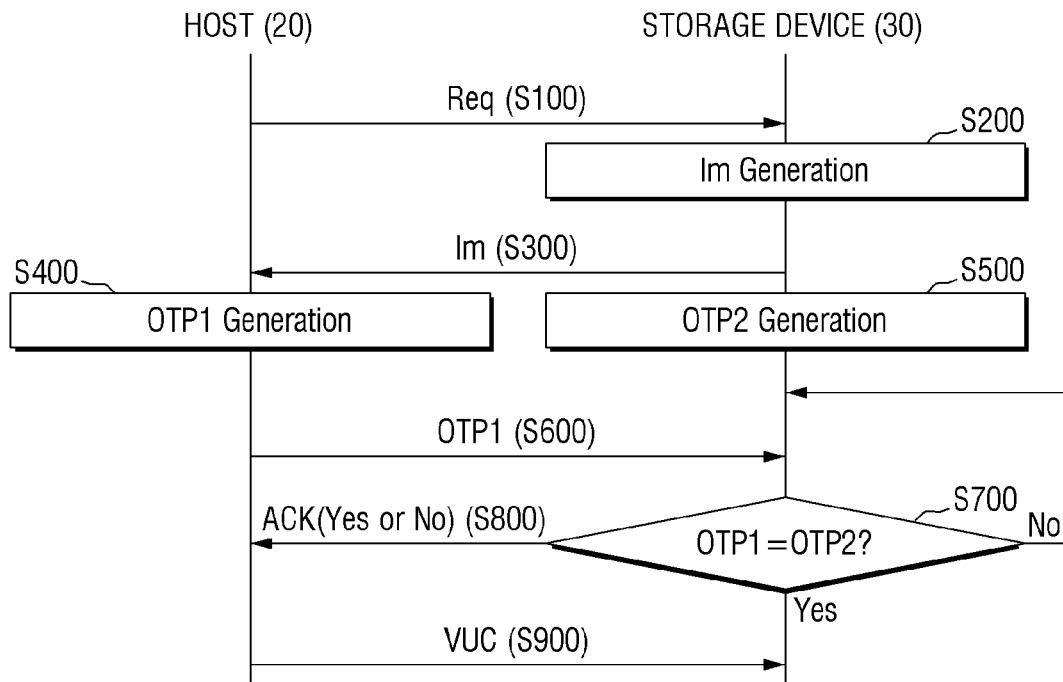
FIG. 19 is a flowchart for explaining a VUC authentication method according to some embodiments.

FIG. 19 is a flowchart for explaining the VUC authentication method according to some embodiments.

Referring to FIGS. 1 and 19, host device 20 transmits an authentication request Req to the storage device 30 (S100).

Correspondingly, storage device 30 generates memory information Im (S200).

Subsequently, storage device 30 transmits the memory information Im to the host device 20 (S300).

Subsequently, host device 20 generates the one-time password OTP1 on the basis of the memory information Im (S400).

In parallel, storage device 30 generates a verification one-time password OTP2 on the basis of the memory information Im (S500).

Subsequently, host device 20 transmits the one-time password OTP1 to the storage device 30 (S600).

Storage device 30 determines whether the one-time password OTP1 and the verification one-time password OTP2 are identical to each other (S700).

If the one-time password OTP1 and the verification one-time password OTP2 are identical to each other (in the case of Yes), storage device 30 transmits the acknowledgement signal ACK to the host device (S800). Subsequently, host device 20 transmits the vendor unique command VUC to storage device 30 (S900).

If the one-time password OTP1 and the verification one-time password OTP2 are different from each other (in the case of No), storage device 30 transmits a non-acknowledgement signal to the host device (S800). Storage device 30 waits until a new one-time password OTP1 arrives (S600).

Hereinafter, the VUC authentication method according to some embodiments will be described with reference to FIGS. 1 and 20. Repeated parts of the description provided above will be simplified or omitted.

Figure 20:
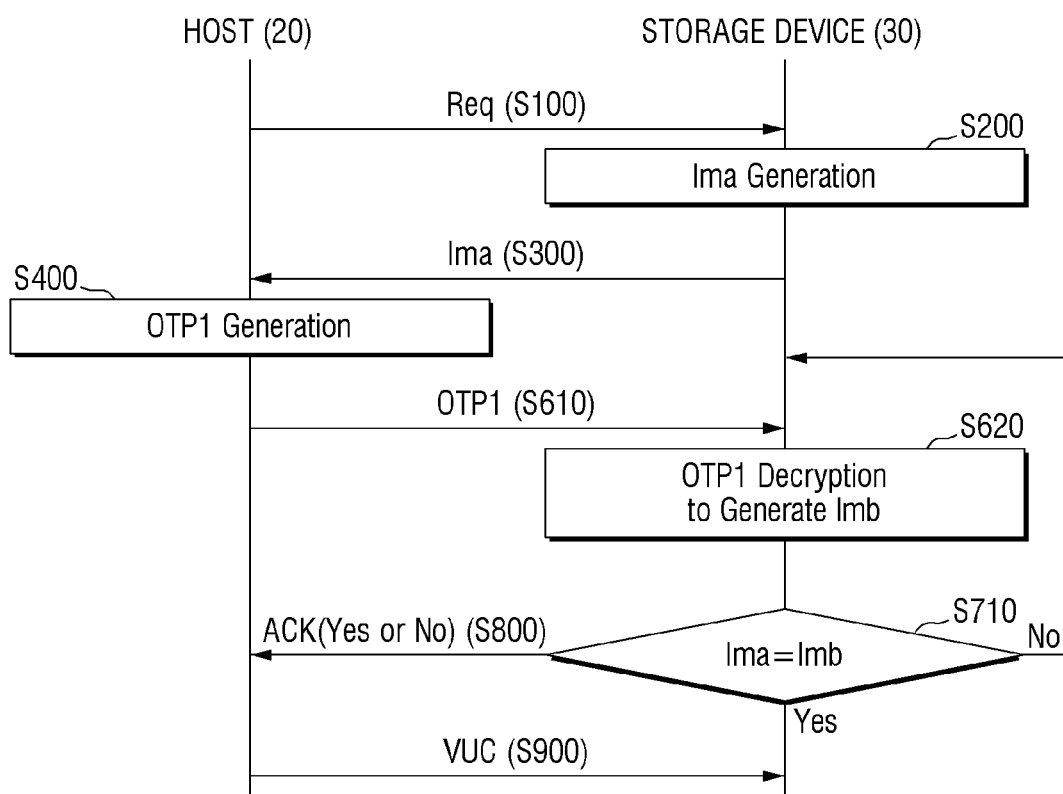
FIG. 20 is a flowchart for explaining the VUC authentication method according to some embodiments.

FIG. 20 is a flowchart for explaining the VUC authentication method according to some embodiments.

Referring to FIGS. 1 and 20, host device 20 transmits an authentication request Req to storage device 30 (S100).

Correspondingly, storage device 30 generates the first memory information Ima (S200).

Subsequently, storage device 30 transmits the first memory information Ima to host device 20 (S300).

Subsequently, host device 20 generates the one-time password OTP1 on the basis of the first memory information Ima (S400).

Subsequently, host device 20 transmits the one-time password OTP1 to storage device 30 (S610).

Subsequently, storage device 30 decrypts the one-time password OTP1 to generate the second memory information Imb (S620).

Storage device 30 determines whether the first memory information Ima and the second memory information Imb are identical to each other (S710).

If the first memory information Ima and the second memory information Imb are identical to each other (in the case of Yes), storage device 30 transmits the acknowledgment signal ACK to the host device (S800). Subsequently, host device 20 transmits the vendor unique command VUC to storage device 30 (S900).

If the first memory information Ima and the second memory information Imb are different from each other (in the case of No), storage device 30 transmits a non-acknowledgement signal to the host device (S800). Storage device 30 waits until a new one-time password OTP1 arrives (S610).

The various operations of methods described above may be performed by any suitable means capable of performing the operations, such as various hardware and/or software component(s), circuits, and/or module(s). In some embodiments, various modules described above may be realized by a collection of hardware and/or firmware elements, which may include one or more application specific integrated circuits, gate arrays, ad the like. In some embodiments, various modules described above may be realized by a processor, such as a central processing unit, executing software.

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In concluding the detailed description, those skilled in the art will appreciate that many variations and modifications may be made to the preferred embodiments without substantially departing from the principles. Therefore, the disclosed preferred embodiments of the invention are used in a generic and descriptive sense only and not for purposes of limitation.

What is claimed is:

1. A storage device, comprising:
a memory; and
a memory controller which includes a vendor unique command (VUC) authentication module and which is configured to control operations of the memory,
wherein the VUC authentication module is configured to:
transmit first memory information about the memory to a host device,
receive from the host device a one-time password generated by the first memory information,
verify the one-time password, and
receive a vendor unique command from the host device when the one-time password is correct.

2. The storage device of claim 1, wherein the first memory information comprises run time information of the memory.

3. The storage device of claim 2, wherein the first memory information comprises at least one of a write count, a remap count and a used block count for the memory.

4. The storage device of claim 3, wherein the first memory information comprises information on a number of one-time password trials which have been performed.

5. The storage device of claim 3, wherein the first memory information comprises a worldwidename (WWN) ID.

6. The storage device of claim 1, wherein the VUC authentication module comprises:
an information extraction module which is configured to extract the first memory information;
a verification one-time password generation module which is configured to generate a verification one-time password, using the first memory information;
a comparator which is configured to compare the one-time password and the verification one-time password with each other, and to output an acknowledgment signal when the one-time password and the verification one-time password are the same as each other; and
a VUC processing module which receives the vendor unique command when receiving the acknowledgment signal.

7. The storage device of claim 6, wherein the verification one-time password generation module comprises a hash function.

8. The storage device of claim 6, wherein the comparator transmits the acknowledgment signal to the host device and the VUC processing module.

9. The storage device of claim 1, wherein the VUC authentication module comprises:
an information extraction module which is configured to extract the first memory information;
a decryption module which is configured to decrypt the one-time password to generate second memory information;
an information comparator which is configured to compare the first and second memory information with each other, and to output an acknowledgment signal when the first and second memory information are the same as each other; and
a VUC processing module which is configured to receive the vendor unique command when receiving the acknowledgment signal.

10. A host device, comprising:
a one-time password generation module which is configured to receive memory information from a storage device, and to generate a one-time password, using the memory information;
a vendor unique command (VUC) generation module which is configured to receive an acknowledgment signal of the one-time password, and to generate a vendor unique command when the acknowledgment signal is received; and
an interface which is configured to receive the memory information and the acknowledgment signal from the storage device, and to transmit the one-time password and the vendor unique command to the storage device.

11. The host device of claim 10, further comprising:
an authentication request module which is configured to generate an authentication request for requesting the memory information to the storage device.

12. The host device of claim 11, further comprising:
a user authentication module which is configured to receive user information from a user to authenticate the user, wherein the authentication request module is configured to generate the authentication request for the user.

13. The host device of claim 11, wherein the interface is configured to transmit the authentication request to the storage device.

14. The host device of claim 10, wherein the interface is configured to transmit and receive a command, an address and data to and from the storage device.

15. The host device of claim 10, wherein the one-time password generation module comprises a hash function operator.

16. A VUC authentication system, comprising:
a host device which is configured to receive first memory information, to generate a one-time password through the first memory information, and to transmit a vendor unique command in accordance with an acknowledgment signal; and
a storage device which includes a memory, and which is configured to generate the first memory information of the memory, to transmit the first memory information to the host device, to verify the one-time password to transfer the acknowledgment signal to the host device, and to receive the vendor unique command,
wherein the first memory information includes runtime information of the memory.

17. The VUC authentication system of claim 16, wherein the storage device comprises a memory controller which includes a VUC authentication module and is configured to control the memory, and
wherein the VUC authentication module comprises:
an information extraction module which is configured to extract the first memory information,
a verification one-time password generation module which is configured to generate a verification one-time password, using the first memory information;
a comparator which is configured to compare the one-time password with the verification one-time password with each other, and to output the acknowledgment signal when the one-time password and the verification one-time password are the same as each other, and a VUC processing module which is configured to receive the vendor unique command when the acknowledgment signal is received.

18. The VUC authentication system of claim 16, wherein the storage device comprises a memory controller which includes a VUC authentication module and is configured to control the memory, and wherein the VUC authentication module comprises:
an information extraction module which is configured to extract the first memory information,
a decryption module which is configured to decrypt the one-time password to generate second memory information,
an information comparator which is configured to compare the first and second memory information with each other and to output the acknowledgment signal when the first and second memory information are the same as each other, and
a VUC processing module which is configured to receive the vendor unique command when the acknowledgment signal is received.

19. The VUC authentication system of claim 16, wherein the host device comprises:
a one-time password generation module which is configured to receive the first memory information from the storage device and to generate the one-time password, using the first memory information,
a VUC generation module which is configured to receive the acknowledgment signal of the one-time password and to generate the vendor unique command when the acknowledgment signal is received, and
an interface which is configured to receive the first memory information and the acknowledgment signal from the storage device and to transmit the one-time password and the vendor unique command to the storage device.

20. The VUC authentication system of claim 16, wherein the first memory information comprises at least one of a write count, a remap count and a used block count.

* * * * *